United States Patent [19]

Fisher

[11] Patent Number: 5,828,569
[45] Date of Patent: Oct. 27, 1998

[54] METHOD AND APPARATUS FOR MAINTAINING NETWORK CONNECTIONS ACROSS A VOLUNTARY PROCESS SWITCHOVER

[75] Inventor: Michael E. Fisher, San Jose, Calif.

[73] Assignee: Tandem Computers, Inc., Cupertino, Calif.

[21] Appl. No.: 861,264

[22] Filed: May 21, 1997

Related U.S. Application Data

[63] Continuation of Ser. No. 377,304, Jan. 23, 1995, abandoned.
[51] Int. Cl.⁶ .................................................. G05B 9/02
[52] U.S. Cl. ........................ 364/187; 364/131; 364/134; 371/9.1; 395/182.11
[58] Field of Search ..................................... 364/131, 134, 364/138, 184, 187; 371/8.1, 9.1; 395/200.79, 200.33, 200.43, 182.11

[56] References Cited

U.S. PATENT DOCUMENTS

| | | |
|---|---|---|
| 4,347,563 | 8/1982 | Paredes et al. .......................... 364/137 |
| 4,590,554 | 5/1986 | Glazer et al. ................................. 371/7 |
| 4,817,091 | 3/1989 | Katzman et al. .......................... 371/9.1 |
| 4,823,256 | 4/1989 | Bishop et al. ............................ 364/187 |
| 5,157,663 | 10/1992 | Major et al. .............................. 371/9.1 |
| 5,271,013 | 12/1993 | Gleeson .................................... 371/9.1 |
| 5,363,503 | 11/1994 | Gleeson .................................... 395/575 |
| 5,455,932 | 10/1995 | Major et al. .............................. 395/489 |

*Primary Examiner*—Paul P. Gordon
*Attorney, Agent, or Firm*—Graham & James LLP

[57] ABSTRACT

A method and apparatus for maintaining network connections across a voluntary takeover involving the use of dual processors in an protocol process node running a protocol process application as an intermediary to server and client applications. The protocol process node's primary processor checkpoints data to a backup processor. The data relates to the creation of a network connection between the server and client. Using the checkpointed data, the backup processor can assume the responsibilities of the primary processor in the event of a voluntary takeover of the primary processor.

25 Claims, 4 Drawing Sheets

METHOD AND APPARATUS FOR MAINTAINING NETWORK CONNECTIONS ACROSS A VOLUNTARY PROCESS SWITCHOVER

This application is a continuation of application Ser. No. 08/377,304 filed Jan. 23, 1995, now abandoned.

BACKGROUND OF THE INVENTION

This invention relates to a method and apparatus for maintaining network connections across a voluntary process switchover. A "takeover" or "switchover" is defined as a switch between processors in a dual processor environment, where one processor backs up the other so that in the event of a failure the backup processor takes over the responsibilities of the primary processor. In the past, network connections between applications that are coordinated through an application running in the primary processor have been lost during takeovers or switchovers. The present invention is directed to enhancing a smooth transition during takeovers, preferably during voluntary takeovers, so that no connections between server and client applications are lost.

SUMMARY OF THE INVENTION

The present invention is intended to provide an improved method and apparatus for maintaining network connections across a switchover in a dual processor environment.

During a switchover, certain data relating to a network connection can be used to ensure that the connection made just prior to the switchover will not be lost. The present invention is directed to disclosing how such data can be archived to maximize the probability of preserving network connections during switchovers in a dual processor environment.

In the preferred embodiment the present invention is used with a Tandem machine running under the NonStop™ operating system kernel and transmitting IPX/SPX data packets, but in general any dual processor hardware environment running any operating system and any communications protocol may utilize the present invention, including TCP/IP. The IPX/SPX protocol is described in the publication "Inside Netware for Unix, Ver. 3.11" by Susan Purcell and Judy Wilson (Novell Research Report, (c) 1992).

DETAILED DESCRIPTION OF THE PREFERRED EMBODIMENTS

Figure 1:
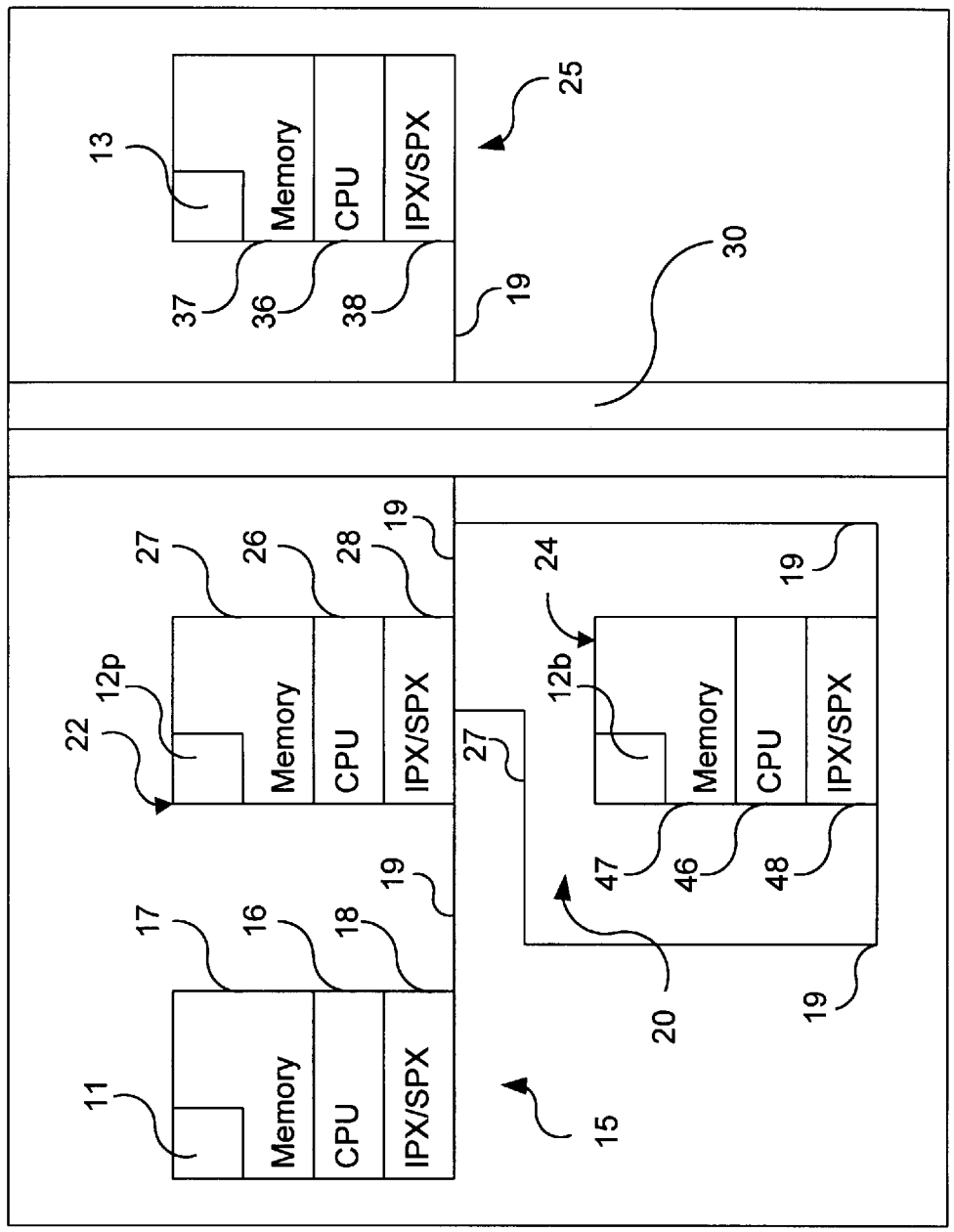
FIG. 1 is a schematic of a dual processor computer system.

Referring to FIG. 1, there is shown a network in which a preferred embodiment of the present invention operates. The network comprises a server node 15 communicating with a protocol process node 20, which in turn communicates with a transmission network 30, which may be a WAN or LAN, operating in a "store-and-forward" message switching mode using data packets, preferably IPX/SPX data packets, and connected to a client node 25.

It will be understood by those skilled in the art that a node comprises a processor, such as processor 16, having primary storage memory, such as memory 17 (eg., RAM), secondary storage memory (not shown, such as disk drives), keyboard, monitor and other I/O ports, such as I/O ports 18, as needed. A data bus or other suitable data path connection 19 connects different node I/O ports to one another and allows IPX/SPX data packets to be sent and received through the ports. Protocol process node 20 comprises two separate and independent nodes, a primary protocol process node 22 and backup protocol process node 24. The protocol process node 20 secures the reliability of the connection between at least one server application or program and a client application.

In FIG. 1 the server node application is shown for conceptional purposes as running from an independent server node 15 that is separate and distinct from protocol process node 20. The client node application is in turn shown running from a separate and distinct client node 25. However, in the general multi-tasking case, the server node (s) and/or the client node(s) do not have to be physically separate and distinct from the protocol process node 20, rather, what is separate and distinct are the applications (programs), such as the server application, residing in a memory 11, the protocol process application, residing in a memory 12p (of the primary node 22) and 12b (of the backup node 24), and the client application, residing in memory 13.

Furthermore it is envisioned that the protocol processor node 20 may support one or more server applications, and a server application often services a multiplicity of client applications.

As before, the protocol process node 20 includes two nodes, primary node 22 and backup node 24, each having its own independent processors: a primary processor and a secondary processor. The protocol processor node 20 stores both the data and code implementing the present invention in primary memory (RAM). The two independent processors communicate with one another any pertinent data relating to securing the reliability of the maintenance of a connection between the server node 15 and the client node 25. Data is transferred to and from the primary and backup nodes along a data path 19, as shown with the double arrows 27 in FIG. 1, and to and from other nodes as well. The primary processor passes such data in real time to the backup processor, which archives the data. The backup processor acknowledges that data has been received, copied and stored in primary memory (RAM), as explained more fully below. The process of passing important data between the primary and backup nodes and the backing up or archiving of this relevant data in the backup processor's memory is known as "checkpointing" the data.

One focus of the present invention is the checkpointing of certain data during a voluntary switch between primary and backup nodes of a protocol process node, also known more generally as a "takeover" or "switchover". A "takeover" or "switchover" is defined as a switch, either voluntary or involuntary, between processors such as found in primary and backup nodes 22, 24. In such a switchover the backup processor of the protocol process processor takes over the duties of the primary processor. Involuntary takeovers can occur in a variety of ways, usually unexpected, such as if the primary processor is damaged or data lines to the primary processor are corrupted. Voluntary takeovers are "planned for" takeovers, and can occur by human intervention (such as during load balancing) or automatically after some event (such as after the failure of certain hardware ports). Furthermore, after a voluntary switchover where the primary processor has not been damaged, and whenever possible, the backup node becomes the primary node, and the primary node backs up the backup node. The present invention allows for a smooth transition during takeovers, preferably during voluntary takeovers, so that no connections between server and client applications are lost. Performing a checkpoint will increase the probability of maintaining a connection between a server application and a client application in the event of a switchover.

Generally, in an IPX/SPX environment a server application forms a point of contact (connection) in a particular node, such as a protocol process node, with a client application, called a "socket" or "IPX/SPX socket". Such an IPX/SPX socket identifies the application (or a higher level protocol) within the node. IPX/SPX sockets can be thought of like a TCP/IP port, as "port" is used in a TCP/IP protocol context. An "endpoint" is a more specific point of contact in that it relates to a data structure that is used by applications. More generally, a connection between server and client applications, such as the server and client applications that reside in memory 11 and memory 13, that interact via a protocol process application, such as the protocol process application which resides in memory 12p and 12b, is termed a "network connection".

Figure 2:
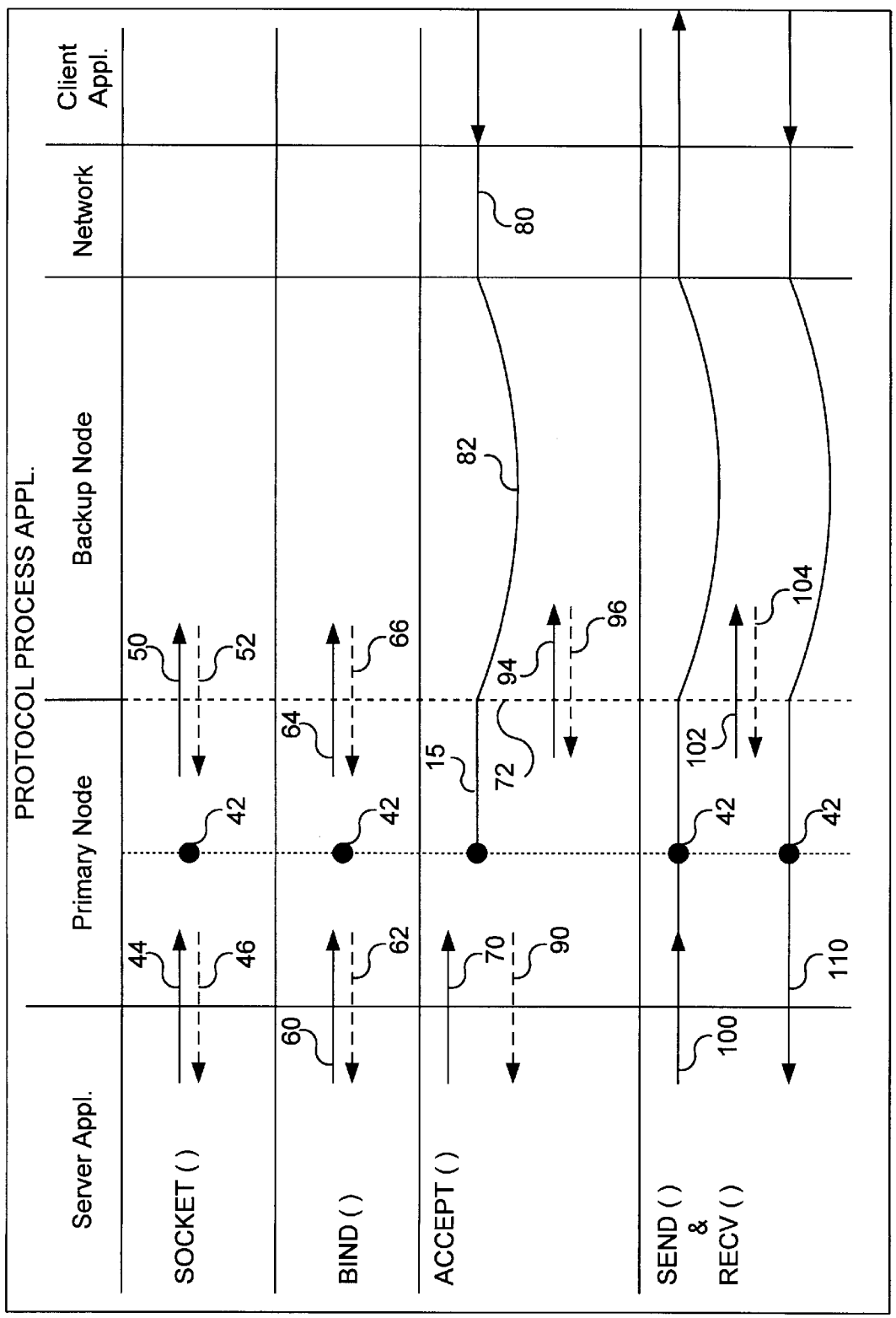
FIG. 2 is a table describing various states present when practicing the present invention.

Turning attention now to FIG. 2, there is shown in a table outlining the variety of states for the network of FIG. 1 when transmitting data, establishing sockets and endpoints, and more generally establishing a network connection between a server application(s), protocol process application(s) and client application(s). The use of solid and dashed arrows between the columns in FIG. 2 representing primary and backup processors indicates communication between these two independent processors and nodes of the protocol process node. Solid and dashed arrows between the columns for server application and protocol process application indicates communication between these applications. The processor of the primary node 22, and the processor of the backup node 24, both run the Tandem NonStop kernel in their operating system.

In a typical application of the present invention, a socket is to be maintained between the server application and a client application. Pertinent data is checkpointed from the primary node processor 26 to the backup processor 46 so that in the event of a takeover of the primary processor, the backup processor takes over the duties of the primary processor and maintains the socket open. It should be understood that generally several sockets may be maintained by a single primary processor. Present Tandem designs allow for about 2500 sockets to be maintained by a single primary processor. Multiple primary processors may be employed in parallel as well.

Referring to FIG. 2, typically a application on a server 15 creates a socket in primary memory 27 (such as RAM) of the primary node 22 of the protocol process node 20 by calling a function, as represented by the row labeled SOCKET(). The socket provides a connection or communication endpoint in primary memory 27 of the primary processor node 22, such as represented by reference number 42, so that the primary processor node may identify the application within the server node that will be accessed by a client application running in client node 25. To this end a message identifying the socket to be opened is passed to the primary processor application from the server processor application, as represented by the solid arrow 44. The primary processor creates an open control block (OCB) in memory at endpoint 42, which will be used by the server application and any future client applications to coordinate the passing of data packets.

An acknowledgement that the socket/OCB has been created by the primary processor 26 is relayed back to the server application, as represented by dashed arrow 46. Because data relating to an OCB/socket is needed to maintain an open socket between a client application and a server application, it must be archived ("checkpointed"). Thus, when the socket is created by the primary processor, data relating to the parameters necessary for the maintenance of the socket, such as the OCB, are checkpointed to the backup processor 24 by the protocol process application, as represented by solid arrow 50, and an acknowledgement that the data has been successfully stored by the backup processor is sent back to the primary processor, as represented by dashed arrow 52. The data structure (OCB) storing this information in the primary memory of both the primary and backup processors of the protocol process processor is an endpoint as well.

In the event that there is voluntary takeover at this point (after the creation of an OCB after the server application calls a socket function, SOCKET()), the takeover would be transparent (invisible) to any end user at the server node, and the connection between server application and protocol process processor application would be maintained without having to reset (kill) the connection.

After this step, an application in the server node typically "binds" to a particular socket, as indicated by the next row in FIG. 2 labeled BIND(), and solid arrow 60, with suitable acknowledgement sent back to the server application, as indicated by dashed arrow 62. During binding, a particular server application is associated with the just created socket, and a network address is created in the protocol process primary node memory 27 for a client application to reference. Since this information is also important to the maintenance of an open network connection or socket between the server and client applications, the primary processor 26 of the primary node 22 checkpoints this data to the backup processor 46 of the backup node 24, as indicated by solid arrow 64, and an acknowledgement of successful archiving of the data in memory is relayed back to the primary processor 26 from the backup processor 46, as indicated by dashed arrow 66.

A voluntary takeover or switchover of the protocol process processor at this point (after the BIND() function call in the server application) would allow the backup processor to assume the role of the primary processor, and the backup processor, using the checkpointed data, could maintain a connection between the server and protocol process node applications with total transparency to an end user at the server, who would not realize a switchover has occurred.

Subsequent to this step, typically an application for a SPX server (a sequential packet exchange server, which guarantees packet delivery) calls a function ACCEPT() (the ACCEPT() function is well known to those skilled in the art and is found in any standard UNIX library). After ACCEPT() the SPX server application goes into a state to await to receive data from a client application. Only SPX servers would utilize the ACCEPT() function, since they are connection oriented and they attempt to ensure the proper sequence of data packets is present through the use of packet 'sequence numbers'. This is in contrast to an IPX server, which operate under a stateless or connection-less server protocol that does not guarantee packet delivery.

In the present invention, the ACCEPT() function call need not be checkpointed after it has been first called by the SPX server application. The absence of checkpointing at this stage is indicated by the absence of arrows at reference number 72 in FIG. 2., indicative of the lack of communication between the primary and backup nodes at this time.

Thus the server application communicates with the primary processor that the ACCEPT() function has been executed, as per arrow 70, but no checkpointing of data relating to the ACCEPT() function call occurs at this point. In the present invention the checkpointing of the ACCEPT function call after it has been called is not needed because in the event of a failure of the primary processor at this point the server node would automatically redirect its requests to the backup processor, because it runs under the fault tolerant Nonstop kernel. The automatic redirection of requests to the backup processor is also described in the U.S. patent application entitled "Network System with Resilient Virtual Fault Tolerant Sessions" by Marc Desgrousilliers, commonly assigned, filed concurrently with the present invention and incorporated by reference herein.

Typically after the completion of calls to SOCKET(), BIND() and ACCEPT() by an SPX server application, a reply will be received by the primary processor in the form of data packets received from a client application, as indicated by line 80. The data is directed by the primary processor to the particular socket bound. The use of an arcuate loop at reference number 82 and throughout FIG. 2 indicates that no data is being routed through the backup processor during this time.

Once a request is received, the primary processor informs the server application that a reply has been received from the client application, as indicated by dashed arrow 90. A connection is now established between the server application and a client application. Once a connection is made, information pertinent to the maintenance of the client-server application connection is checkpointed, such as the address of the client, by the primary processor to the backup processor, as indicated by arrows 94, 96. In the event of a voluntary takeover at this point (after ACCEPT() has been acknowledged and the address of the client checkpointed), the backup processor would have enough information to maintain the connection between the server and client nodes.

The creation of a socket, binding of the socket and, optionally, (in a SPX server) a call to ACCEPT() as described above, constitutes only a fraction of the time spent by and between a client application and server application. The majority of the time is spent sending and receiving data in the form of data packets, preferably IPX/SPX data packets. Thus a server application sends data by calling a function SEND(), as indicated by arrow 100, for use in the client application. Likewise, as indicated by arrow 110, a server application accepts data from a client node by calling a function RECV().

Under present technology there is no checkpointing of individual data packets transmitted and received by the server application, because of the sheer number of such data packets in a typical application. Presently, rather than the individual data packets sent and received being checkpointed during sending and receiving of such packets, data is checkpointed that relates to whether the server and client applications are in a connected state or a not connected state. In the connected state the SEND() and RECV() functions may be employed to send and receive data packets, respectively, between client and server applications. In the not connected state such a connection is not present, and SEND() and RECV() cannot be used. Data indicating whether or not the client and server applications are in a connected or not connected state would be checkpointed, as indicated by arrows 102, 104, and in the event of a takeover, if the applications are in a connected state, the backup node would use any such checkpointed data to continue to process the SEND() and RECV() functions transparently. If the applications are in a not connected state, then the entire process would have to be reset by the protocol process application.

In the case of an SPX server, which, unlike an IPX server, is concerned with guaranteeing data packet delivery, the maintenance of a connection is complicated because sequence numbers are included along with data packets transmitted. If there is a failure of the primary processor, the backup processor takes over but does not necessarily know what the sequence numbers have been received, since the individual data packets are not checkpointed. Thus the backup processor cannot guarantee that the data packets have been properly sent, which violates SPX protocol. This situation usually means that the network connection between the SPX server and client has to be killed (reset).

There are, however, a few exceptions to this general rule that send/receive connections are killed in SPX servers during a takeover. One is in the case of voluntary takeovers involving, in the Tandem environment, a voluntary switch from the primary protocol node to the backup node, such as by human operator choice (e.g., for load balancing between processors) or in the event certain hardware ports are corrupted, such as ports found in I/O port 28 that interface with the transmission network 30 and the primary processor 26 in primary node 22. Both of these takeovers can be planned for, and are thus considered voluntary takeovers. In these types of voluntary takeovers, just prior to switching processors, primary node 22 checkpoints sequence numbers from data packets present (and queued) in its memory. Thus, once such a voluntary takeover occurs, the network connection between SPX client and server applications is maintained transparently.

Figure 4:
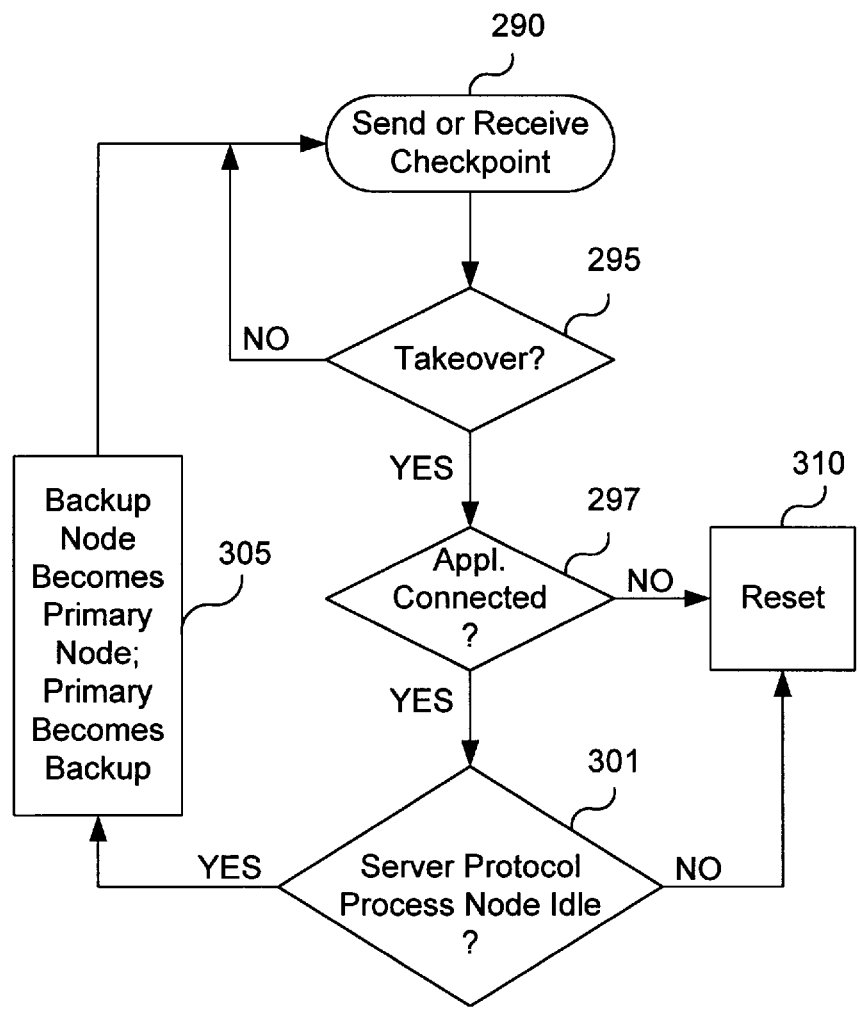

However, in a preferred embodiment of the present invention, as represented by FIG. 4, even in the case of a such a voluntary switchover a connection is not in fact maintained if any data packets are being queued by the primary protocol process—which correspond to data packets waiting to be read by the SPX server, or data packets waiting to be transmitted to the client node application—that is, if the SPX server/ protocol process application connection is "non idle". Since in most instances a connection is "idle" anyway, for the most part there is no need to plan for "non idle" states. This is because typically no queue is present while a server application is reading, and the transmission of data packets between the protocol processor and client application is efficient enough that relatively little retransmission and waiting for acknowledgement of data occurs. However, from the above teaching one can modify the FIG. 4 embodiment of practicing the present invention so that even queued data is checkpointed just prior to a voluntary takeover, thus obviating the distinction between "idle" and "non-idle" server/ protocol processor application connections, and allowing connections between client and server applications to always be maintained in a voluntary takeover, when in the SEND() and RECV() states.

Figure 3:
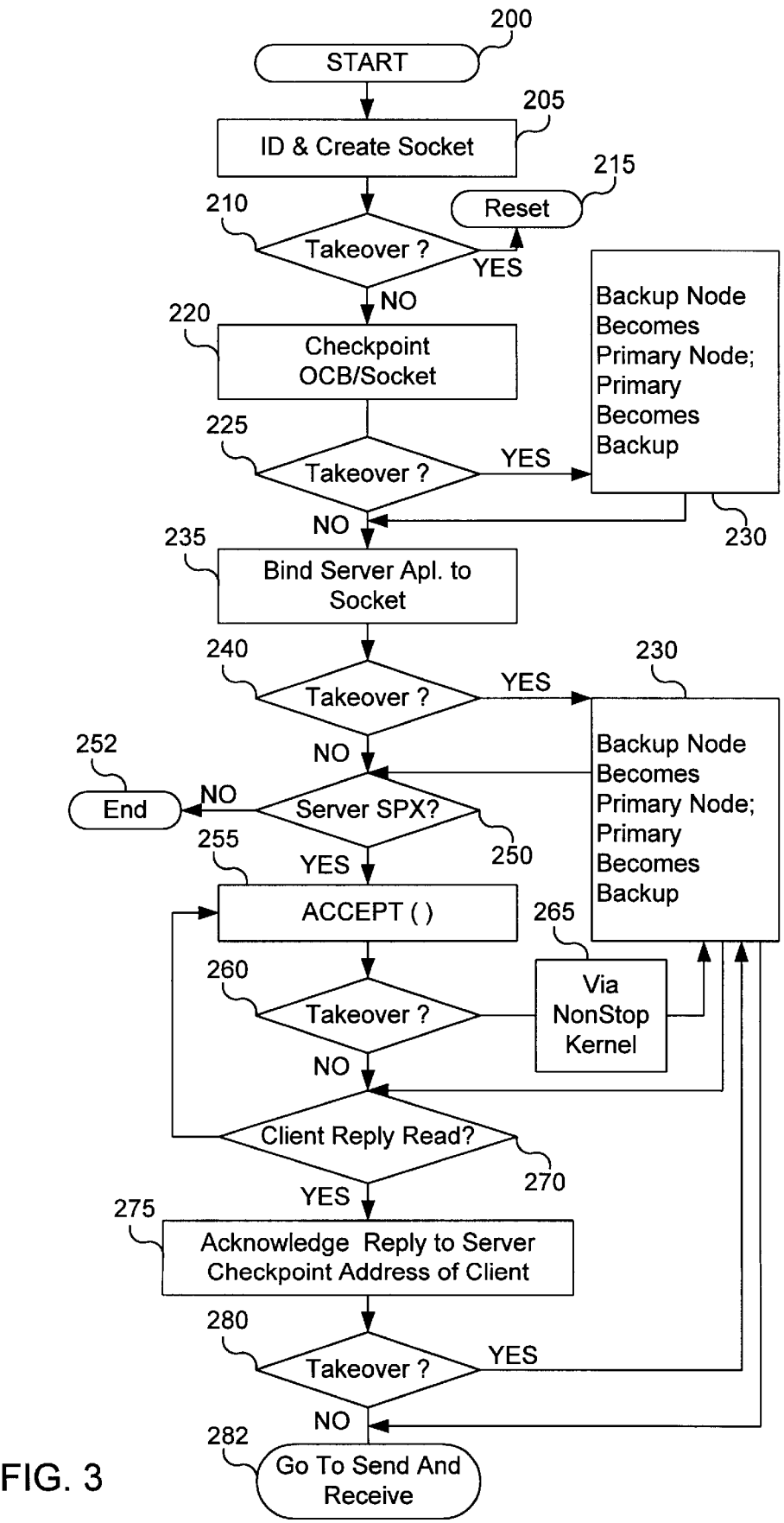
FIGS. 3 and 4 are flowcharts describing the operation of the present invention.

Turning attention now to FIGS. 3 and 4, there are depicted flowcharts describing a preferred embodiment of the invention as described above in conjunction with FIGS. 1 and 2, and intended to augment and in no way diminish the foregoing description.

FIG. 3 describes the process as implemented by a typical application of the present invention. For purpose of illustration, throughout the flowcharts it is assumed that a voluntary takeover is being contemplated, as described above, and that the primary node is not damaged and can serve as a backup to the original backup node (which would be employed after the takeover as a 'primary node'), unless otherwise specified.

A socket is to be opened between a server application and a client application, with data transmitted between server and client applications via network 30 by the primary processor node 22 of the dual processor protocol process node 20. To this end, at step 205, a unique socket is created by an application (program) in the server node working in conjunction with the protocol process application in the primary node 22 that implements the present invention, as explained above in conjunction with SOCKET() and FIG. 2. Data and messages are passed between the server and primary node applications to create and acknowledge the creation of an OCB/socket in the primary node's memory. Since no checkpointing of the OCB/socket has been performed at this point, a takeover at this point (step 210) would necessitate a reset of the process (step 215), and the endpoint related to the socket/OCB would be killed, and the process restarted at step 200. Once the data relating to the OCB/socket is checkpointed by the protocol process application from the primary to backup node (step 220), a takeover at this point (step 225) would enable the backup node to assume the responsibilities of the primary node, with the primary node becoming the "backup" to the former backup node (step 230).

The server application then typically binds the socket (step 235), associating it with a particular application, and creates a network address for a client application to reference. This information is checkpointed from the primary to the backup node, so that in the event of a takeover after this point (step 240) the backup node becomes the primary node (step 230) in a seamless and invisible manner to the server application, without having to reset.

At step 250, the server application confirms that the server application is an SPX server (sequential packet exchange server), and if not, there is no need to proceed and the server application exits (step 252). If the server is a SPX server, the application proceeds to the ACCEPT() function (step 255), which is a function that puts an SPX server application in a state in which it awaits to receive data from a client application. A takeover at this point would allow the backup node to takeover the primary node functions, with the understanding that there is no need to checkpoint an ACCEPT() function, because the NonStop kernel that the protocol process node runs under would automatically redirect requests directed to the primary node processor 26 to the backup processor 46 (step 265). The automatic redirection of requests to the backup processor is also described in the U.S. patent application entitled "Network System with Resilient Virtual Fault Tolerant Sessions" by Marc Desgrousilliers, commonly assigned, filed concurrently with the present invention and incorporated by reference herein.

Once a client application responds to the primary processor of the processor node, as indicated by step 270, the reply is acknowledged by the protocol process application of the primary node to the server application, information relating to the address of the client is checkpointed, as per step 275, and a connection is established between the server and client applications. A takeover after this point (step 280) would not result in resetting of the socket between client and server nodes, as indicated by step 230. The network connection is now ready to send and receive IPX/SPX data packets, as indicated in step 282.

Referring now to FIG. 4, which relates to SPX servers, typically the bulk of an application's time is spent not in establishing an endpoint or socket, but rather in sending and receiving data packets (step 290). After the connection has been established between client and server applications, the data that relates to the establishment of the connection is checkpointed (step 290). In the event of a takeover during the sending and receiving of data (step 295), if the network connection between the applications is in a connected state (step 297) and the connection between server and primary applications is "idle" (step 301), then the backup node may seamlessly and transparently assume the primary nodes responsibilities (step 305). Otherwise, if the applications are not connected or the connection is non-idle, the relevant sockets are reset (step 310). An idle connection is as defined above, and relates to the absence of a queue of data packets in the protocol process application.

In one embodiment of the present invention a relatively high level language, C, is employed to implement the software associated with the present invention, however, any language may be used. Further one skilled in the art will appreciate that any software instructions used to implement the invention described herein (code), data, data structures and any computer hardware incorporating the same form an integrated whole, together with any other similar structures in the network system, to form the present invention.

The foregoing description is offered for illustrative purposes only. Numerous modifications and variations may be readily apparent to those skilled in the art, while still falling within the spirit and scope of the invention as claimed herein below.

What is claimed is:

1. A method for maintaining network connections between a plurality of applications, the method comprising the steps, performed by one or more processors, of:

communicating data between a first application and a primary node running a primary node protocol process application;

said communicated data relating to establishing a network connection between the first application and the primary node protocol process application, said primary node connected to a backup node, and said primary and backup nodes each having independent processors;

checkpointing said communicated data from said primary node to said backup node;

employing, in the event of a voluntary switchover from said primary node to said backup node, said checkpointed data by said backup node to maintain said network connection between said first application and said protocol process application, so that communication between said first application and said protocol process application is not interrupted by the voluntary switchover.

2. The method of claim 1, wherein the employing step is transparent to human users of the system.

3. The method of claim 1, wherein the step of communicating data includes a step of communicating data between the first application and the primary node to bind the first application to a socket, further including a step of establishing a network address for the bound socket in the primary node, wherein the step of checkpointing the communicated data includes a step of checkpointing the network address from the primary node to the backup node.

4. The method of claim 3, wherein the switchover occurs after the network address is checkpointed in the network address checkpointing step, wherein the employing step includes a step of employing the network address by the backup node to maintain the network connection between the first application and the protocol process application.

5. The method of claim 3, further including the steps of:

communicating data between the first application and a primary node to bind the first application to a second socket, further including a step of establishing a second network address for the second bound socket, wherein the step of checkpointing the communicated data includes a step of checkpointing the second network address from the primary node to the backup node.

6. The method of claim 1, wherein the primary node and backup node each include a processor.

7. The method of claim 1, wherein the first application is a server application, further including a step of:

transmitting data between the server application and a client application.

8. The method of claim 1, wherein the step of communicating data includes a step of communicating data between the first application and the primary node, the data identifying a socket to be opened, further including a step of establishing an open control block in the primary node containing data for the opened socket, wherein the step of checkpointing the communicated data includes a step of checkpointing the open control block from the primary node to the backup node.

9. The method of claim 8, wherein the switchover occurs after the open control block is checkpointed in the open control block checkpointing step, wherein the employing step includes a step of employing the open control block by the backup node to maintain the network connection between the first application and the protocol process application.

10. The method of claim 1, wherein the voluntary switchover is a voluntary process switchover and is caused by human intervention.

11. The method of claim 1, wherein the voluntary switchover is a voluntary process switchover and occurs automatically under control of an operating system due to a failure of the network connection.

12. A data processing system for transmitting data packets, comprising:

at least one protocol process node, server node, and client node, said protocol process node comprising two independent nodes, a primary node and a backup node, each having its own processor and memory and communicating with one another;

means, in said primary node, for communicating with said server and client nodes to send and receive data packets, wherein said server and client nodes communicate with one another via said primary node to form a network connection;

means for checkpointing predetermined ones of the data packets from said primary node to said backup node;

means for, in the event of a voluntary switchover from said primary node to said backup node, employing said communicated data by said backup node to maintain said network connection between said server node and said client node, so that communication between said server node and said client node is not interrupted by the voluntary switchover.

13. The apparatus of claim 12, wherein the communicating means includes means for communicating data between the first application and the primary node, the data identifying a socket to be opened, further including means for establishing an open control block in the primary node containing data for the opened socket, wherein the checkpointing means includes means for checkpointing the open control block from the primary node to the backup node.

14. The apparatus of claim 13, wherein the switchover occurs after the open control block is checkpointed by the open control block checkpointing means, wherein the employing means includes means for employing the open control block by the backup node to maintain the network connection between the first application and the protocol process application.

15. The apparatus of claim 12:

wherein the communicating means includes means for communicating data between the first application and the primary node to bind the first application to a socket, further including means for establishing a network address for the bound socket in the primary node, wherein the checkpointing means includes means for checkpointing the network address from the primary node to the backup node.

16. The apparatus of claim 15, wherein the switchover occurs after the network address is checkpointed by the network address checkpointing means, wherein the employing means includes means for employing the network address by the backup node to maintain the network connection between the first application and the protocol process application.

17. A method for maintaining a network connection between a first and a second application of a plurality of applications, the method comprising the steps, performed by a data processing system, of:

establishing a connection between the first application and a protocol process application;

transmitting data packets between the first application and the second application via the protocol process application, each of the data packets having an identifying sequence number;

checkpointing the sequence number of the transmitted data packets from a primary node of the protocol process application to a backup node of the protocol process application; and employing, in the event of a voluntary switchover from the primary node to the backup node, the checkpointed data by the backup node to maintain the network connection between the first application and the second application, so that communication between the first application and the second application is not interrupted by the voluntary switchover.

18. The method of claim 17, wherein the checkpointing step further includes a step of:

checkpointing, when the protocol process application is not idle, transmitted packets from the primary node to the backup node.

19. The method of claim 17, wherein the checkpointing step includes a step of:

checkpointing, from the primary node to the backup node, socket binding data needed to establish the connection between the first application and the protocol process application; and wherein the employing step includes a step of:

employing, during a voluntary switchover from the primary node to the backup node, the socket binding data by the backup node to maintain the network connection between the first application and the primary protocol process, so that communication between the first application and the primary protocol process is not interrupted by the voluntary switchover.

20. An apparatus for establishing and maintaining network connections between applications, the apparatus including:

a first portion configured to establish a network connection within a primary node on behalf of a client application and a server application, the network connection usable by the client and server applications to exchange data packets; and a second portion configured to checkpoint data describing the network connection from the primary node to a backup node;

a third portion configured to receive the checkpoint data within the backup node; and a fourth portion configured to use the checkpointed data to maintain the network connection during a voluntary switchover, the maintained network connection passing through and being managed by the backup node.

21. An apparatus as recited in claim 20 wherein each data packet includes a sequence number and wherein the apparatus further includes:

a fifth portion configured to checkpoint the sequence numbers of the transmitted data packets from the primary node to the backup node; and a sixth portion configured to ensure correct data packet ordering following voluntary switchover.

22. An apparatus as recited in claim 20 wherein the first portion is configured to establish a network connection within behalf of a client application executing on a client node and a server application executing on a server node where the client and server nodes are remote from the primary and backup nodes.

23. A computer program product comprising:

a computer usable medium having computer readable code embodied therein for establishing and maintaining network connections between applications, the computer program product comprising:

first computer readable program code devises configured to cause a primary node to establish a network connection on behalf of a client application and a server application, the network connection usable by the client and server applications to exchange data packets;

second computer readable program code devices configured to cause the primary node to checkpoint data describing the network connection to a backup node;

third computer readable program code devices configured to cause the backup node to receive the checkpoint data describing the network connection; and fourth computer readable program code devices configured to cause the backup node to use the checkpointed data to maintain the network connection during a voluntary switchover, the maintained network connection passing through and being managed by the backup node.

24. A computer program product as recited in claim 23 wherein the first computer readable program code devices are configured to establish a network connection within behalf of a client application executing on a client node and a server application executing on a server node where the client and server nodes are remote from the primary and backup nodes.

25. A computer program product as recited in claim 23 wherein each data packet includes a sequence number and wherein the computer program product further includes:

fifth computer readable program code devices configured to cause the primary node to checkpoint the sequence numbers of the transmitted data packets to the backup node; and sixth computer readable program code devices configured to cause the backup node to ensure correct data packet ordering following voluntary switchover.

* * * * *